United States Patent [19]
Furukawa

[11] Patent Number: 6,009,362
[45] Date of Patent: Dec. 28, 1999

[54] ANOMALOUS CONDITION DETECTING APPARATUS FOR COOLING MOTOR FAN

[75] Inventor: Tomofumi Furukawa, Kanagawa-ken, Japan

[73] Assignee: Nissan Motor Co., Ltd., Yokohama, Japan

[21] Appl. No.: 08/921,277

[22] Filed: Aug. 29, 1997

[30] Foreign Application Priority Data

| Aug. 29, 1996 | [JP] | Japan | 8-228785 |
| Aug. 29, 1996 | [JP] | Japan | 8-228786 |
| Jun. 19, 1997 | [JP] | Japan | 9-163106 |

[51] Int. Cl.$^6$ ............................................. H02H 7/00
[52] U.S. Cl. .............................................. 701/29; 361/33
[58] Field of Search ............................... 701/29; 340/438; 324/772, 503; 123/41.11, 41.12, 41.15; 361/23, 33

[56] References Cited

U.S. PATENT DOCUMENTS

| 4,441,076 | 4/1984 | Baum | 324/772 |
| 4,691,668 | 9/1987 | West | 123/41.12 |
| 4,752,851 | 6/1988 | Ritter | 361/31 |
| 4,765,284 | 8/1988 | Kanazawa et al. | 123/41.49 |
| 4,977,375 | 12/1990 | Toth | 324/511 |
| 5,448,143 | 9/1995 | Pecone | 318/434 |
| 5,738,049 | 4/1998 | Ninomiya | 123/41.15 |
| 5,790,430 | 8/1998 | Steiert | 361/6 |

*Primary Examiner*—Michael J. Zanelli
*Attorney, Agent, or Firm*—Foley & Lardner

[57] ABSTRACT

The present invention relates to an apparatus for detecting an anomalous condition of a cooling motor fan to be mounted on a vehicle. The anomalous condition detecting apparatus includes a detector for detecting a pair of positive and negative terminals of a motor of the motor fan and a decision circuit for deciding whether an anomalous condition exists or not based on a voltage detected between the terminals. For example, an external resistor is provided between the positive terminal of the motor and the power source, the negative terminal of the motor is earthed, a voltage between the terminals of the motor is detected as a potential of the positive terminal, and the decision circuit decides that an anomalous condition exists when the potential of the positive terminal is smaller than a predetermined value in a state that a drive signal of the motor fan is being output. Accordingly, it is possible to detect an anomalous condition of the motor fan at low cost.

13 Claims, 6 Drawing Sheets

ANOMALOUS CONDITION DETECTING APPARATUS FOR COOLING MOTOR FAN

The contents of Application No. TOKUGANHEI 8-228785 filed Aug. 29, 1996, and No. TOKUGANHEI 8-228786 filed Aug. 29, 1996, in Japan are hereby incorporated by reference.

BACKGROUND OF THE INVENTION

The present invention relates to an anomalous condition detecting apparatus for a motor fan to be mounted on a vehicle for cooling engine cooling water or a medium for air conditioning.

A cooling motor fan to be mounted on a vehicle can not achieve its full function when the rotation of the cooling motor fan is stopped (a locked state) though this state is not wanted or when the operation of the cooling motor fan is in an over-loaded state (a half-locked state), because of a foreign material caught into the fan, for example. Therefore, it is necessary to take measures for checking from time to time whether the motor fan of the vehicle is in an abnormal state or note, and when an anomalous condition has occurred, for making this state to be known to vehicle occupants or for compulsively stopping the motor fan.

As an apparatus for detecting an anomalous condition such as a locked state or a half-locked state of a motor fan, there has been a device for detecting the rotation number of the fan by a magnetic or photo-electric pulse sensor or the like and for deciding that the motor fan is in an anomalous state when the rotation number is below a reference value. As a lock state detector, there is a one for detecting an excess current which flows during a locked time.

SUMMARY OF THE INVENTION

However, in order to detect the rotation number of a fan by a pulse sensor, a high-cost pulse sensor is required. Further, for increasing the detection precision, it is necessary to severely manage the clearance between a blade of the fan and the pulse sensor, and thus a strictly high precision is required for setting the pulse sensor. Furthermore, a special amplifier for making a decision of the pulse is necessary. Accordingly, the cost is increased substantially.

On the other hand, according to a method for deciding a locked state by detecting a current, a large-scale current measuring device is required when a large capacity (not lower than 15 A of current) is used such as is used by a motor fan. This also increases the cost and further generates a problem of layout, which is not realistic.

It is therefore an object of the present invention to provide an anomalous condition detecting apparatus for a cooling motor fan which can restrict a cost increase and can solve the problem of layout.

In order to achieve the above object, a first anomalous condition detecting apparatus of the present invention includes a detecting apparatus for detecting a voltage between a pair of positive and negative terminals of a motor of a motor fan and a decision circuit for deciding whether an anomalous condition exists or not based on the voltage detected between the terminals.

When the negative terminal is earthed, the voltage between the terminals is detected as a potential of the positive terminal of the motor.

According to the above-described structure, the voltage between the terminals of the motor of the motor fan or the potential of the positive terminal is detected, and the anomalous or normal condition is decided based on the detected value. Therefore, it is possible to detect an occurrence of the anomalous condition of the motor fan at minimum cost without a necessity for additionally providing a special device. The problem of layout does not occur either.

It is also possible to take such a structure that an external resistor is provided between the positive terminal of the motor and the power source, the motor fan operates by receiving a drive signal, and the decision circuit makes a decision that the anomalous condition when the voltage between the terminals is smaller than a first predetermined value in the state of the drive signal being output.

In the above-described structure, it is also possible to decide the anomalous condition of a line disconnection or the like at the upstream of the motor fan, in addition to that it is possible to decide the anomalous condition of a locked state or a half-locked state of the motor fan.

It is also possible to take such a structure that the decision circuit makes a decision that the anomalous condition exists when the voltage between the terminals is smaller than a first predetermined value and larger than a second predetermined value in the state that the drive signal is not being output to the motor fan.

In the above-described structure, when the motor fan is being driven without being asked, this can also be decided as anomalous.

It is also possible to set the first predetermined value based on a reference value to be determined by a resistance ratio between resistance values of the external resistor and an internal resistor of the motor and a voltage of the power source during a normal rotation of the motor.

According to the above-described structure, it is possible to decide accurately an occurrence of the anomalous condition.

The first predetermined value can also be set as a value obtained by subtracting a variation value in the voltage between the terminals from the reference value.

According to the above-described structure, an occurrence of the anomalous condition can be decided further accurately without making an erroneous recognition that a drop in the potential of the positive terminal attributable to a voltage drop, waste of battery or an un-earthing of the earth is anomalous.

Further, a second anomalous condition detecting apparatus of the present invention includes a detecting apparatus for detecting a rotational electromotive force generated according to a rotation of the motor during a driving of the motor fan, and a decision circuit for deciding whether an anomalous condition exists or not based on the detected rotational electromotive force.

When the motor has a plurality of pairs of positive and negative terminals, the rotational electromotive force is obtained by being detected as a potential difference between the positive and negative terminals other than the terminals being used for driving the motor.

The motor can also include a commutator having a plurality of conductive blocks mutually insulated, a pair of conductive brushes for contacting with the commutator, and a plurality of coils connected in series through the plurality of conductive blocks so that the brushes as detectors are brought into contact with the commutator between the pair of conductive brushes. In this case, the rotational electromotive force can be obtained by being detected as a potential between the coils generated in the detecting brushes. Further, when the detecting brushes are formed by a thin panel having conductivity and flexibility and when the detecting brushes are pressured contact with the commutator in a flexibly folded state, a conduction failure can be prevented.

According to the above-described structure, the rotational electromotive force of the motor fan is detected and an existence of the anomalous condition can be decided based on the detected value. Therefore, similar to the above-described first anomalous condition detecting apparatus, it is also possible to detect an occurrence of the anomalous condition of the motor fan at minimum cost without additionally providing a special device. The problem of layout does not occur either.

It is also possible to take such a structure that the motor fan operates by receiving a drive signal and that the decision circuit decides the anomalous condition when the rotational electromotive force is smaller than a predetermined value in the state that the drive signal is being output.

In the above-described structure, it is also possible to decide the anomalous condition of a line disconnection or the like at the upstream of the motor fan, in addition to that an anomalous condition of a locked state or a half-locked state of the motor fan can be decided.

The predetermined value can also be set as a value obtained by subtracting a variation value in the rotational electromotive force from a value of the rotational electromotive force during a normal rotation of the motor.

According to the above-described structure, an occurrence of the anomalous condition can be decided further accurately without making an erroneous recognition that a drop in the potential of the positive terminal attributable to a voltage drop, waste of battery or an un-earthing of the earth is anomalous.

Further, a third anomalous condition detecting apparatus of the present invention includes a detecting apparatus for detecting a potential between motors of first and second cooling motor fans and a decision circuit for deciding whether an anomalous condition exists or not based on the detected potential between the motors.

According to the above-described structure, since the potential between the motors is detected and an existence of the anomalous condition or not is decided based on the detected value, it is possible to detect the occurrence of the anomalous condition of the motor fan at minimum cost without additionally providing a special device, in a similar manner as the above-described first and second anomalous condition detecting apparatus. The problem of layout does not occur either.

It is also possible to take such a structure that the motor fan operates by receiving a drive signal and that the decision circuit makes a decision that the anomalous condition exists when the voltage between the motors is smaller than a first predetermined value or larger than a second predetermined value which is larger than the first predetermined value in the state that a drive signal is being output to the motor fan.

In the above-described structure, it is also possible to decide the anomalous condition of a line disconnection or the like at the upstream of the motor fan, in addition to that an anomalous condition of a locked state or a half-locked state of the motor fan can be decided.

The first predetermined value can also be set as a value obtained by subtracting a variation value in the potential between the motors from a value of the potential between the motors during a normal rotation thereof, and the second predetermined value can also be set as a value obtained by adding the variation value in the potential to the value of the potential during the normal rotation.

According to the above-described structure, an occurrence of the anomalous condition can be decided further accurately without making an erroneous recognition that a drop in the potential of the positive terminal attributable to a voltage drop, waste of battery or an un-earthing of the earth is anomalous.

DESCRIPTION OF THE PREFERRED EMBODIMENTS

Embodiments of the present invention will be explained below with reference to the drawings.

First Embodiment

A first embodiment is an application of the present invention to an anomalous condition detecting apparatus for a two-brush and two-pole motor fan, for detecting an anomalous condition of the motor fan based on a potential of a positive terminal of the motor.

Figure 1:
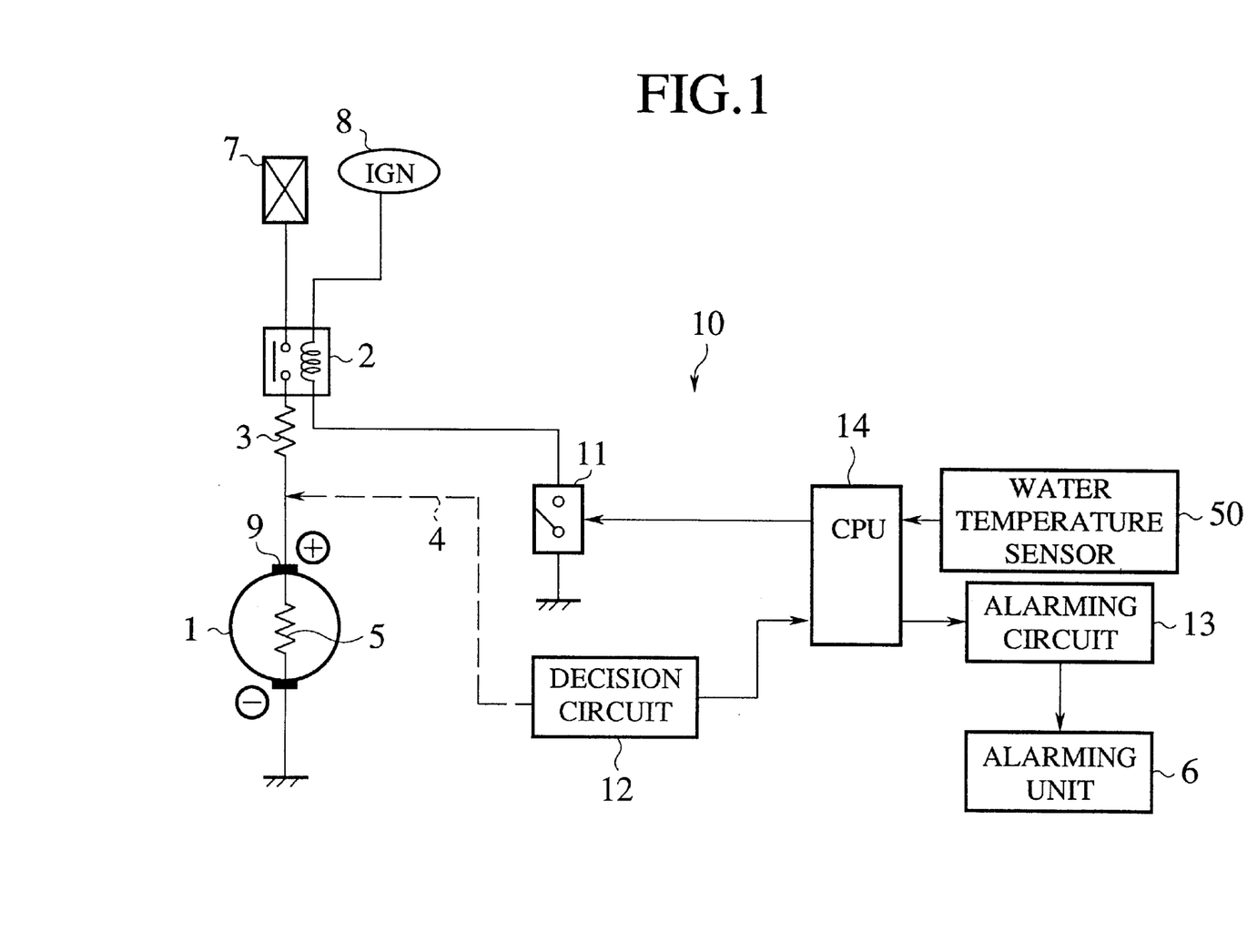
FIG. 1 is a circuit diagram for showing an anomalous condition detecting apparatus for a cooling motor fan relating to a first embodiment of the present invention.

FIG. 1 is a circuit diagram for showing a drive/anomalous condition detecting apparatus for a motor fan relating to the present embodiment.

As shown in FIG. 1, the motor fan and the anomalous condition detecting apparatus of the present embodiment include a two-brush and two-pole motor 1 which is a driving force of the motor fan, a relay 2, an external resistor 3, an alarming unit 6, a battery 7 which is a power source, a control unit 10 and a water temperature sensor 50.

The motor 1 is connected to the battery 7 through the relay 2. The internal resistor 5 is provided within the motor 1.

The alarming unit 6 is a display unit such as a lamp display unit incorporated within an instrument panel, for example, or an alarming unit for generating an alarm sound, for giving an anomalous alarm to vehicle occupants.

The water temperature sensor 50 is for detecting the temperature of the engine cooling water.

The control unit 10 has a switch 11, a decision circuit 12, an alarming circuit 13 and a CPU 14.

A temperature of the engine cooling water is applied to the CPU 14 from the water temperature sensor 50. When the temperature of the engine cooling water has exceeded a predetermined value, the CPU 14 turns on the switch 11. The relay 2 is turned on when the ignition switch 8 is in the on state and when the switch 11 is turned on at the same time (that is, when a drive signal of the motor fan has been output), so that the motor 1 is driven.

The external resistor 3 is provided between a positive terminal 9 of the motor 1 and the relay 2. One end of a harness 4 is connected between the external resistor 3 and the positive terminal 9 of the motor 1, and the other end of the harness 4 is connected to the decision circuit 12. A potential of the positive terminal 9 of the motor 1 (hereinafter referred to as a motor terminal potential VF) is detected by the harness 4, and the motor terminal potential VF is input to the decision circuit 12 one after another.

When the relay 2 is on (that is, when the drive signal of the motor fan is being output), the decision circuit 12 decides one after another whether the value of the motor terminal potential VF is suitable or not.

When the motor 1 is normally rotating, the terminal potential VF becomes a predetermined value (hereinafter referred to as a reference Va) to be determined by a resistance ratio between the resistance of the external resistor 3 and the resistance of the internal resistor 5 and a battery voltage. On the other hand, when the rotation of the motor 1 is compulsively stopped (hereinafter referred to as a locked state) without being asked, by a foreign material being caught into the fan, or when the motor 1 is in an excessively loaded state (hereinafter referred to as a half-locked state), the motor resistance value is lowered. Accordingly, the above resistance ratio changes and the motor terminal potential VF is lowered by a value according to the change of the resistance ratio to a value smaller than the reference value.

Accordingly, the decision circuit 12 compares the motor terminal potential VF with the value of the reference value Va minus a variation value α. When a decision has been made such that the motor terminal potential VF is smaller than the value of the reference value Va minus the variation value α, namely, when the following expression has been satisfied, $$VF < Va - \alpha$$

a decision is made that an anomalous condition has occurred, and the decision circuit 12 outputs an anomalous condition occurrence signal to the CPU 14. The variation value α is a maximum value of a variation in the motor terminal potential caused by a voltage drop, waste of battery and an un-earthing of the earth, or the like.

In response to the anomalous condition occurrence signal, the CPU 14 turns off the switch 11 and, at the same time, outputs the signal to the alarming circuit 13. When the switch 11 has been turned off, the relay 2 is turned off, so that the power supply from the battery 7 to the motor 1 is stopped, and then the motor 1 stops.

On the other hand, the alarming circuit 13 which has received a signal input from the CPU 14 operates the alarming unit 6, which informs the crew of the occurrence of an anomalous condition.

Further, when a line disconnection has occurred at the upstream circuit of the motor fan, for example, other than an occurrence of a locked state or a half-locked state of the motor fan, the above expression is satisfied, so that, even in this case, the alarming unit 6 is operated and the occurrence of an anomalous condition is informed to the vehicle occupants.

As described above, according to the present embodiment, since the presence or absence of an anomalous condition (such as a locked state, a half-locked state, an upstream line disconnection, or the like) of the motor fan can be decided by detecting the motor terminal potential VF, such inconveniences as a cost increase or a high-precision setting is not incurred unlike the case of detecting a fan rotation number by using an expensive pulse sensor. This further improves the reliability. Moreover, even if a large-capacity motor is used, a large-scale current measuring device is not required at all. Accordingly, this results in an easy setting, no cost increase, an improved reliability and no occurrence of a layout problem.

Further, even if the switch 11 is in the off state, there is a case where the motor 1 is operated without being asked because the relay 2 is held in the on state by a fusion of the relay switch, for example. In this case, the motor terminal potential VF takes a value in excess of "0" although this value should essentially be "0".

Accordingly, when the switch 11 is in the off state, the decision circuit 12 compares the motor terminal potential VF with the variation value α. When a decision has been made that the motor terminal potential VF is larger than the variation value α, namely, when the following expression is satisfied, $$VF > +\alpha$$

the decision circuit 12 decides that the motor fan is operating without being asked, and outputs an anomalous condition occurrence signal to the CPU 14. As a result, a crew is informed of the occurrence of an anomalous condition by the alarming unit 6.

In the above-described embodiment, although the external resistor 3 is provided between the relay 2 and the positive terminal 9 of the motor 1, it is also possible to detect a change of the motor terminal potential VF by utilizing the resistance of the harness for connecting the relay 2 and the positive terminal 9. When the resistance of the harness is utilized in this way, it is not necessary to provide the external resistor 3, which simplifies the structure.

In the above-described embodiment, a potential of the positive terminal of the motor is detected and the presence or absence of an anomalous condition is decided based on this detection. However, instead of this, it is also possible to detect a voltage between the terminals of the motor and to decide presence or absence of an anomalous condition based on this detection.

Second Embodiment

A second embodiment is an application of the present invention to an anomalous condition detecting apparatus for a four-brush and four-pole motor fan, for detecting an anomalous condition of the motor fan based on a rotational electromotive force of the motor fan.

Figure 2:
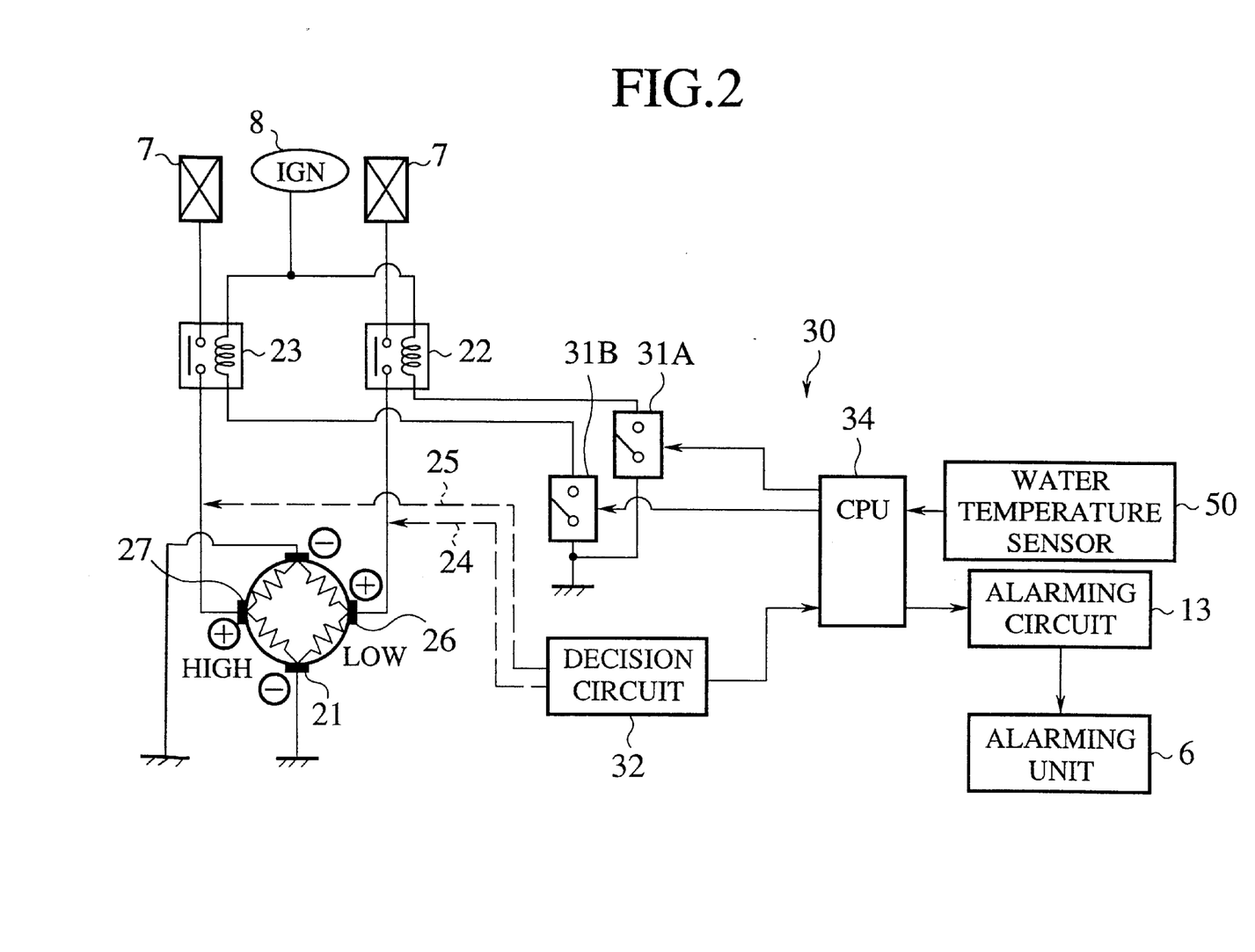
FIG. 2 is a circuit diagram for showing an anomalous condition detecting apparatus for a cooling motor fan relating to a second embodiment of the present invention.

FIG. 2 is a circuit diagram for showing a drive/anomalous condition detecting apparatus for a motor fan relating to the present embodiment. Structural elements which are the same as those of the first embodiment are attached with the same reference numbers and their explanation will be omitted.

As shown in FIG. 2, the motor fan and the anomalous condition detecting apparatus of the present embodiment include a four-brush and four-pole motor 21 which is a driving force of the motor fan, relays 22 and 23, an alarming unit 6, a battery 7, a control unit 30 and a water temperature sensor 50.

A Low-side positive terminal 26 of the motor 21 is connected to the battery 7 through the relay 22 and a High-side positive terminal 27 of the motor 21 is connected to the battery 7 through the relay 23.

The control unit 30 has switches 31A and 31B, a decision circuit 32, an alarming circuit 13 and a CPU 34.

A temperature of the engine cooling water is applied to the CPU 34 from the water temperature sensor 50. When the temperature of the engine cooling water has exceeded a first predetermined value, the CPU 34 turns on the switch 31A. The relay 22 is turned on when the ignition switch 8 is in the on state and when the switch 31A is turned on at the same time, so that the motor 21 is operated at a low speed. When the temperature of the engine cooling water has exceeded a second predetermined value (a higher temperature than the first predetermined value), the CPU 34 turns on the switch 31B. The relay 23 is turned on when the ignition switch 8 is in the on state and when the switch 31B is turned on at the same time, so that the motor 21 is operated at a high speed.

One end of a harness 24 is connected between the relay 22 and the Low-side positive terminal 26 of the motor 21, and the other end of the harness 24 is being connected to the decision circuit 32. One end of a harness 25 is connected between the relay 23 and the High-side positive terminal 27, and the other end of the harness 25 is being connected to the decision circuit 32. The potential of the Low-side positive terminal 26 of the motor 1 (hereinafter referred to as Low terminal potential VFL) is detected by the harness 24, and the potential of the High-side positive terminal 27 of the motor 1 (hereinafter referred to as High terminal potential VFH) is detected by the harness 25. The Low terminal potential VFL and the High terminal potential VFH are input to the decision circuit 32 one after another.

When the relay 22 is on (that is, when the drive signal of the motor fan is being output), the decision circuit 32 decides one after another whether the values of the Low terminal potential VFL and the High terminal potential VFH are suitable or not.

When the relay 22 has been turned on and the motor 21 is being driven at low speed, the rotational electromotive force of the motor fan (that is, the inductive electromotive force generated according to the rotation of the motor 21) is output as the High terminal potential VFH.

When the motor 21 is being driven at low speed, if the rotation of the motor is normal, the High terminal potential VFH becomes a reference value Vb according to the electromotive force of the motor 21. On the other hand, when the motor 21 is put in the locked state or the half-locked state due to a catching of a foreign material, the rotational electromotive force of the motor fan is lowered so that the High terminal potential VFH is lowered to a level smaller than the reference potential Vb.

Accordingly, the decision circuit 32 compares the High terminal potential VFH with the value of the reference value Vb minus a variation value β. When a decision has been made such that the High terminal potential VFH is smaller than the value of the reference value Vb minus the variation value β, namely, when the following expression has been satisfied, $$VFH<Vb-\beta$$

a decision is made that an anomalous condition has occurred, and the decision circuit 32 outputs an anomalous condition occurrence signal to the CPU 34. The variation value β is a maximum value of a variation in the rotational electromotive force caused by a voltage drop, waste of battery and an un-earthing of the earth, or the like.

In response to the anomalous condition occurrence signal, the CPU 34 turns off the switch 31A and, at the same time, outputs the signal to the alarming circuit 13. When the switch 31A has been turned off, the relay 22 is turned off, so that the power supply from the battery 7 to the motor 21 is stopped, and then the motor 21 stops.

On the other hand, the alarming circuit 13 which has received a signal input from the CPU 34 operates the alarming unit 6, which informs the vehicle occupants of the occurrence of an anomalous condition.

As described above, according to the present embodiment, since the presence or absence of an anomalous condition (such as a locked state or a half-locked state) of the motor fan can be decided by detecting the motor electromotive force, this results in an easy setting, no cost increase, an improved reliability and no occurrence of a layout problem, as is the case with the first embodiment.

Further, when the motor 21 is being normally driven at low speed, the Low terminal potential VFL becomes equal to a battery voltage Vc. On the other hand, when a line disconnection or the like has occurred at an upstream circuit of the motor fan, the Low terminal potential VFL is lowered to a level lower than the battery voltage Vc.

Accordingly, during the low speed driving of the motor 21, the decision circuit 32 compares the Low terminal potential VFL with the battery voltage Vc. When a decision has been made such that the Low terminal potential VFL is smaller than the value of the battery voltage Vc minus the variation value β, namely, when the following expression has been satisfied, $$VFL<Vc-\beta$$

a decision is made that an anomalous condition such as a line disconnection has occurred, and the decision circuit 32 outputs an anomalous condition occurrence signal to the CPU 34. As a result, the vehicle occupants are informed of the occurrence of an anomalous condition by the alarming unit 6.

Further, even if the switch 31A is in the off state, there is a case where the motor 21 is operated without being asked because the relay 22 is held in the on state by a fusion of the relay switch, for example. In this case, the High terminal potential VFH takes a value in excess of "0" although this value should essentially be "0".

Accordingly, when the switch 31A is in the off state, the decision circuit 32 compares the High terminal potential VFH with the variation value β. When a decision has been made that the High terminal potential VFH is larger than the variation value β, namely, when the following expression is satisfied, $$VFH>+\beta$$

the decision circuit 32 decides that the motor fan is operating without being asked, and outputs an anomalous condition occurrence signal to the CPU 34. As a result, the crew is informed of the occurrence of an anomalous condition by the alarming unit 6.

Third Embodiment

A third embodiment is an application of the present invention to an anomalous condition detecting apparatus for two-brush and two-pole motor fans connected in series by two, for detecting an anomalous condition of the motor fan based on a potential between motors.

Figure 3:
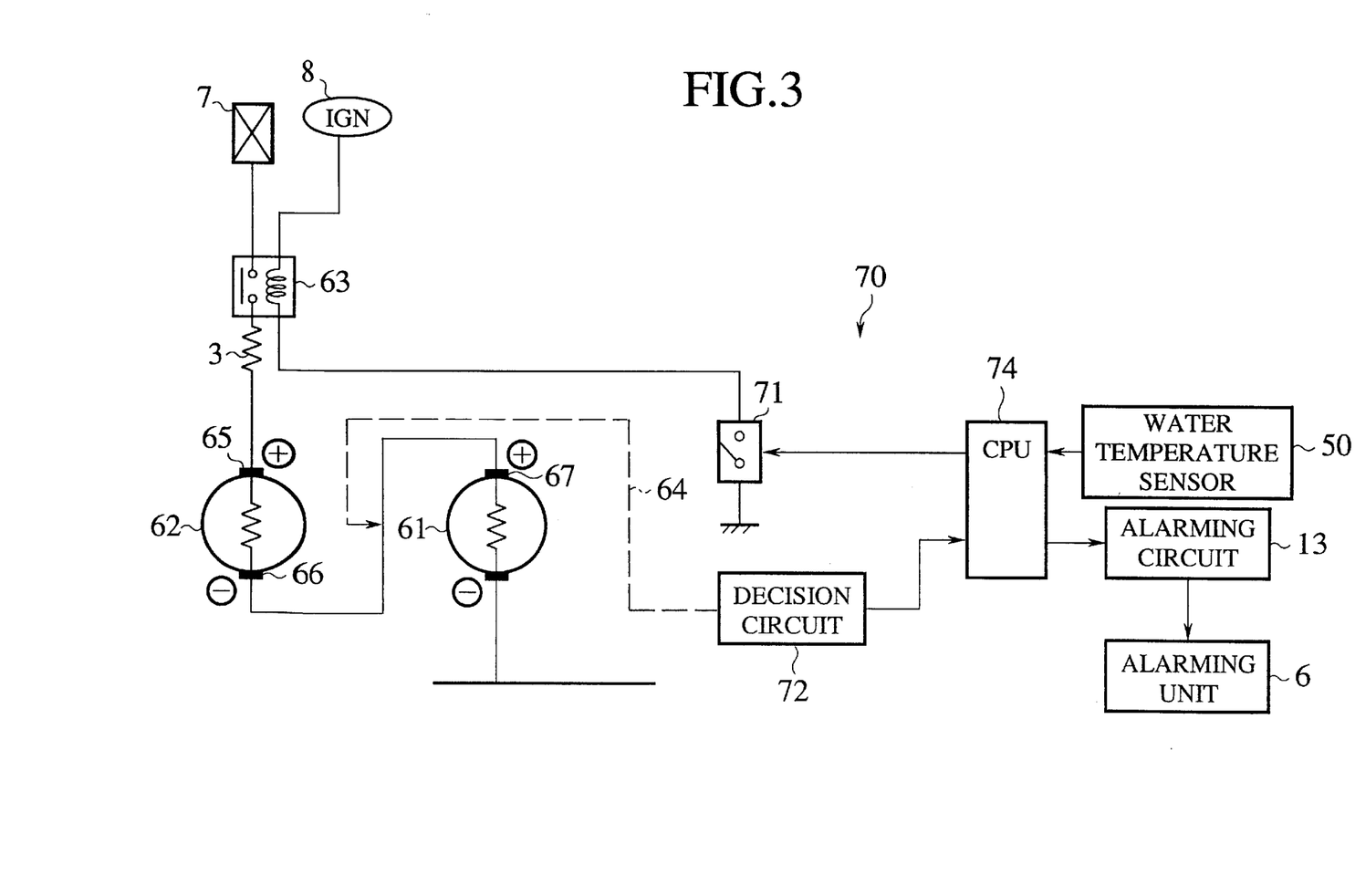
FIG. 3 is a circuit diagram for showing an anomalous condition detecting apparatus for a cooling motor fan relating to a third embodiment of the present invention.

FIG. 3 is a circuit diagram for showing a drive/anomalous condition detecting apparatus for a motor fan relating to the present embodiment. Structural elements which are the same as those of the first embodiment are attached with the same reference numbers and their explanation will be omitted.

As shown in FIG. 3, the motor fan and the anomalous condition detecting apparatus of the present embodiment include two two-brush and two-pole motors 61 and 62 which are a driving force of the motor fan, a relay 63, an alarming unit 6, a battery 7, a control unit 70 and a water temperature sensor 50.

The motors 61 and 62 are connected in series and the positive terminal 65 of the motor 62 is connected to the battery 7 through the relay 63.

The control unit 70 has a switch 71, a decision circuit 72, an alarming circuit 13 and a CPU 74.

A temperature of the engine cooling water is applied to the CPU 74 from the water temperature sensor 50. When the temperature of the engine cooling water has exceeded a predetermined value, the CPU 74 turns on the switch 71. The relay 63 is turned on when the ignition switch 8 is in the on state and when the switch 71 is turned on at the same time, so that the motors 61 and 62 are rotated.

One end of a harness 64 is connected between a negative load 66 of the motor 62 and a positive terminal 67 of the motor 61, and the other end of the harness 64 is being connected to the decision circuit 72. The potential between the motor 61 and the motor 62 (hereinafter referred to as an intermotor potential VFM) is detected by the harness 64, and the inter-motor potential VFM is input to the decision circuit 72 one after another.

When the relay 63 is on (that is, when the drive signal of the motor fan is being output), the decision circuit 72 decides one after another whether the value of the intermotor potential VFM is suitable or not.

When the relay 63 has been turned on and the motors 61 and 62 are being driven and if both motors are rotating normally, the inter-motor potential VFM becomes a reference value Vm to be determined by a motor resistance ratio of the motors 61 and 62. On the other hand, when the motor 61 or 62 is put in the locked state or the half-locked state due to a catching of a foreign material, the resistance value of the motor is lowered, so that the motor resistance ratio changes, and the inter-motor potential VFM changes by a volume according to this change. To be more specific, when an anomalous condition has occurred in any one of the motors, the inter-motor potential VFM becomes higher than the reference voltage Vm, and when an anomalous condition has occurred in the other motor, the inter-motor potential VFM becomes lower than the reference potential Vm.

Accordingly, the decision circuit 72 compares the inter-motor potential VFM with the reference value Vm minus a variation value $\gamma$ and with the reference value Vm plus the variation value $\gamma$. When a decision has been made such that the inter-motor potential VFM is smaller than the value of the reference value Vm minus the variation value $\gamma$ or when a decision has been made that the inter-motor potential VFM is smaller than the value of the reference value Vm plus the variation value $\gamma$, namely, when the following expression has been satisfied, $$VFM<Vm-\gamma, \text{ or } VFM>Vm+\gamma$$

a decision is made that an anomalous condition has occurred, and the decision circuit 72 outputs an anomalous condition occurrence signal to the CPU 74. As a result, the crew is informed of the occurrence of an anomalous condition by the alarming unit 6. The variation value $\gamma$ is a maximum value of a variation in the potential between the motors 61, 62 caused by a voltage drop, waste of battery and an un-earthing of the earth, or the like.

Further, when a line disconnection has occurred at an upstream circuit of the motor fan, for example, other than an occurrence of a locked state or a half-locked state of the motor fan, the above expression (VFM<Vm-$\gamma$) is satisfied, so that, even in this case, the alarming unit 6 is operated and the occurrence of an anomalous condition is informed to the vehicle occupants.

As described above, according to the present embodiment, since the presence or absence of an anomalous condition of the motor fan can be decided by detecting the inter-motor potential, this results in an easy setting, no cost increase, an improved reliability and no occurrence of a layout problem, as is the case with the first embodiment.

Further, even if the switch 71 is in the off state, there is a case where the motors 61 and 62 are operated without being asked because the relay 63 is held in the on state by a fusion of the relay switch, for example. In this case, the inter-motor potential VFM takes a value in excess of "0" although this value should essentially be "0".

Accordingly, when the switch 71 is in the off state, the decision circuit 72 compares the inter-motor potential VFM with the variation value $\gamma$. When a decision has been made that the inter-motor potential VFM is larger than the variation value $\gamma$, namely, when the following expression is satisfied, $$VFM>+\gamma$$

the decision circuit 72 decides that the motor fan is operating without being asked, and outputs an anomalous condition occurrence signal to the CPU 74. As a result, the vehicle occupants are informed of the occurrence of an anomalous condition by the alarming unit 6.

Fourth Embodiment

A fourth embodiment is an application of the present invention to an anomalous condition detecting apparatus for a two-brush and two-pole motor fan, for detecting an anomalous condition of the motor fan based on an electromotive force of the motor fan, as is the case with the second embodiment.

However, since the above-described second embodiment uses the potential of the High-side positive terminal of the four-brush and four-pole motor during a slow-speed rotation, this can not be applied directly to the two-brush and two-pole motor fan. In other words, the present embodiment is different from the second embodiment in that the two-brush and two-pole motor can detect an electromotive force. Since the structure other than that for deciding a presence or absence of an anomalous condition of the motor is the same as that of the first embodiment, detailed explanation of this portion will be omitted.

Figure 4:
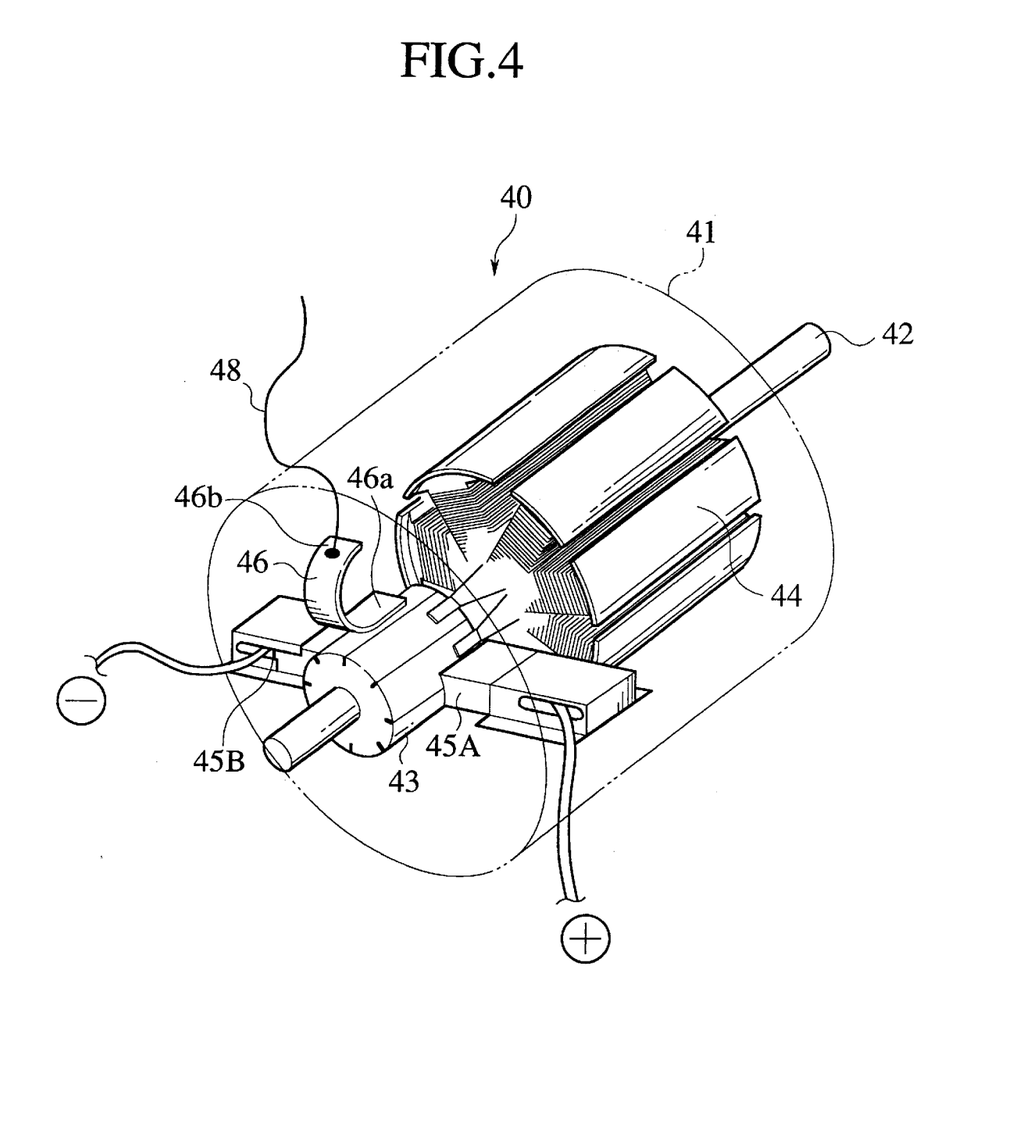
FIG. 4 is a perspective view of key elements for showing an internal structure of a motor for a cooling motor fan relating to a fourth embodiment of the present invention.
Figure 5:
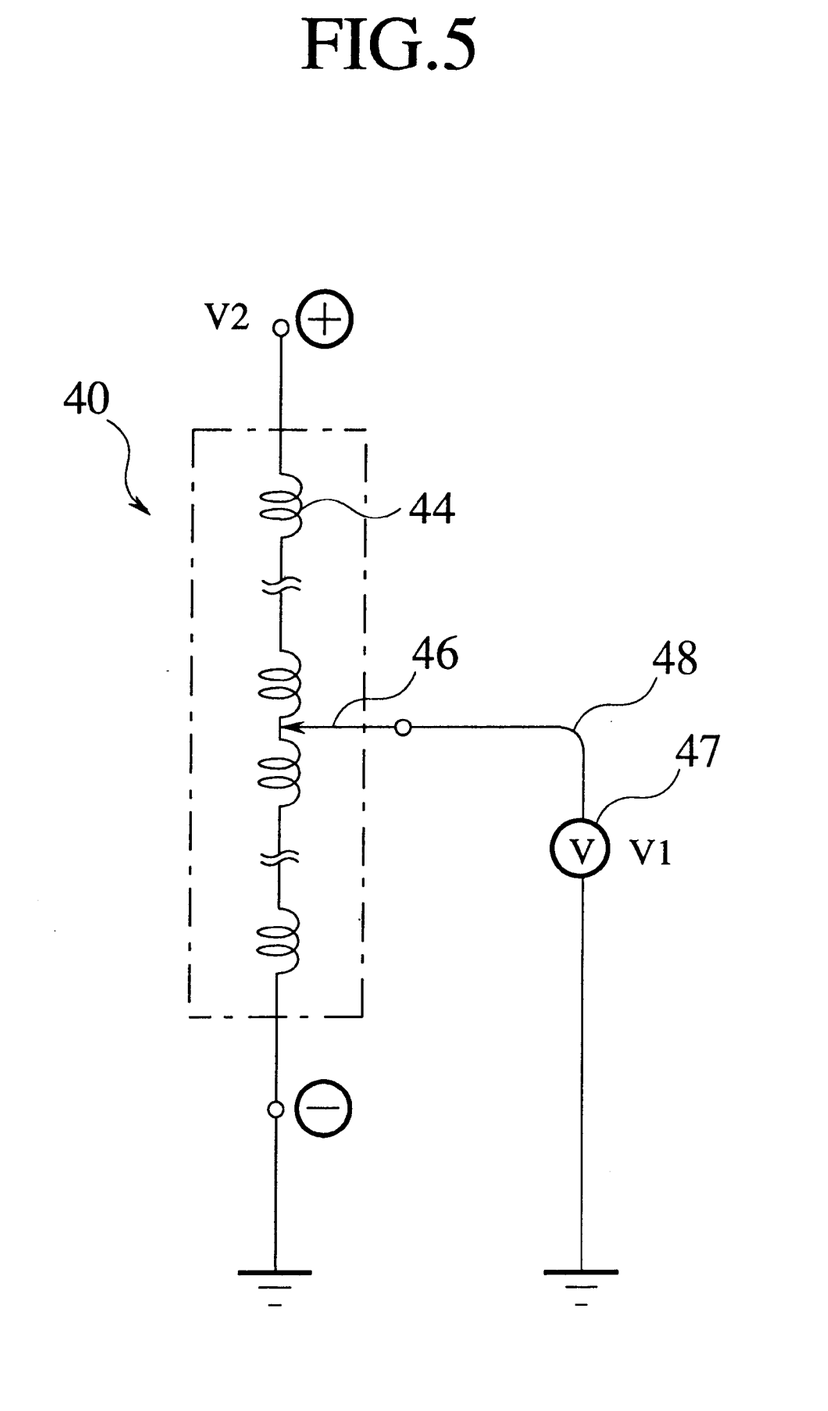
FIG. 5 is a circuit diagram for showing the motor shown in FIG. 4.

FIG. 4 is a perspective view of the key elements for showing the internal structure of the motor (fan motor) for a motor fan relating to the present embodiment, and FIG. 5 is an electrical circuit diagram thereof.

As shown in FIG. 4, a motor 40 includes a main body case 41, a rotary axis 42, a commutator 43, a plurality of armature coils 44, a pair of conductive brushes 45A and 45B, and an auxiliary brush for measuring a potential (detecting brush) 46.

The rotary axis 42 is rotatably supported within the main body case 41. The commutator 43 has a plurality of mutually insulated conductive blocks and is supported by the rotary axis 42. The plurality of armature coils 44 are connected in series through each conductive block of the commutator 43 as shown in the circuit diagram in FIG. 5. The pair of conductive brushes 45A and 45B are brought into contact with the commutator 43 in mutually faced state. The brush 45A is connected to a battery and the other brush 45B is grounded.

The auxiliary brush 46 is provided to be in contact with the commutator 43 between the pair of conductive brushes 45A and 45B. The auxiliary brush 46 is constituted by a flexible thin panel-shaped conductor and is fitted inside the main body case 41 by being flexibly folded in a U-shape by a pressing member (not shown). One end 46a of the auxiliary brush 46 is being pressed to be in contact with the commutator and the other end 46b is connected to a potential measuring device 47 through a harness 48 as shown in FIG. 5. Accordingly, the potential measuring device 47 detects a potential V1 between the coils 44 within the motor 40. The inter-coil potential V1 is an inductive electromotive force generated in the coils 44 (a rotational electromotive force of the motor fan).

When a predetermined voltage V2 is applied to the brush 45A, a current flows between both brushes 45A and 45B through the commutator 43 and the coil 44. When the coil 44 is conducted, the rotary axis 42 is rotated so that a fan (not shown) fitted to the rotary axis 42 is rotated.

Figure 6:
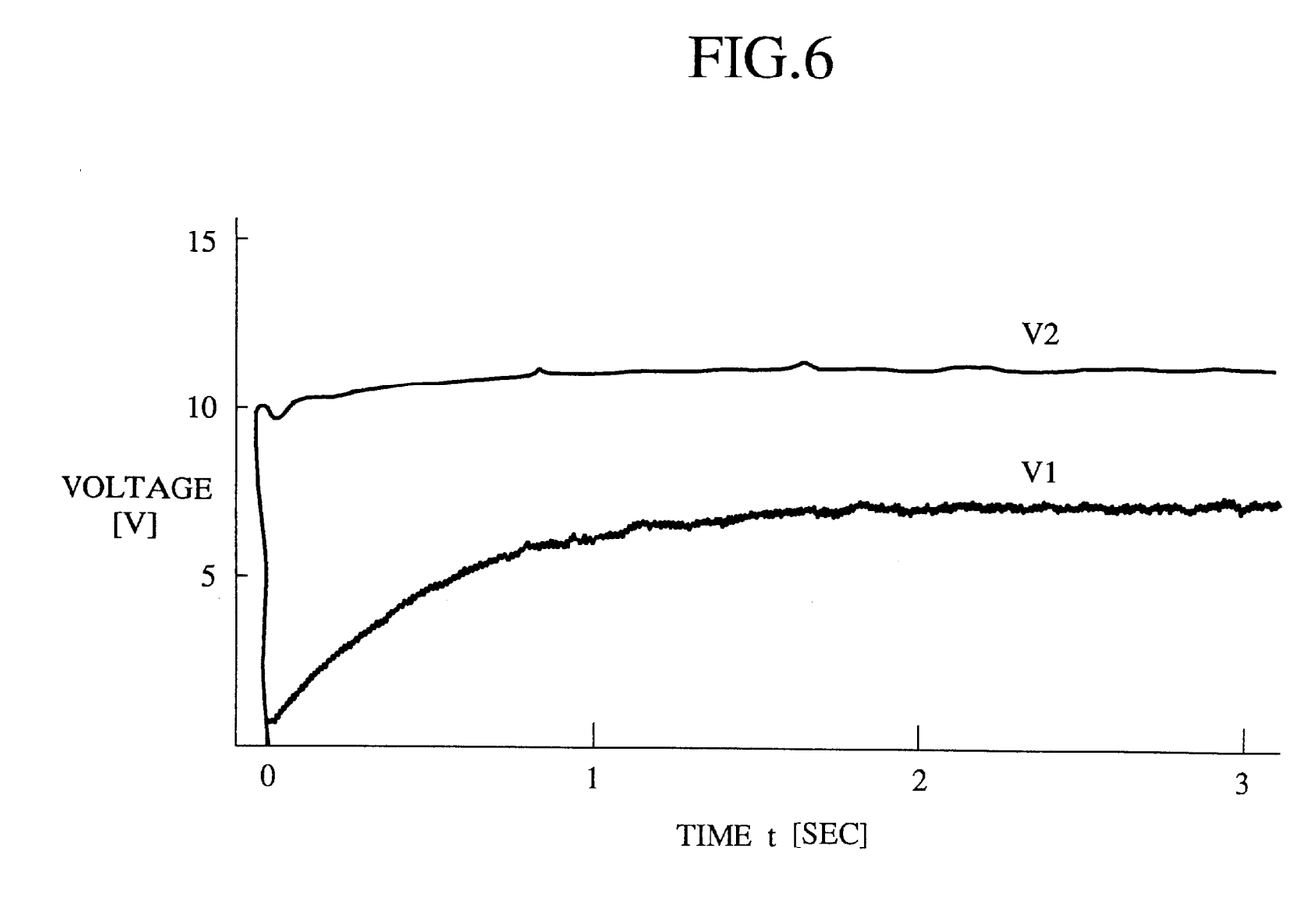
FIG. 6 is a graph for showing a relationship between an inter-coil potential V1 and a potential V2 of a positive terminal of the motor during a lapsed time from the start of a current conduction to the motor.

While the motor 40 is rotating normally, an inductive electromotive force is generated in each coil 44 by the commutation work. Similarly, the auxiliary brush 46 is also commutated. Since the relationship between each coil 44 and the magnetic field of this coil 44 is constant, the inter-coil potential V1 detected by the potential measuring device 47 becomes a constant voltage according to the motor rotation number. FIG. 6 shows a relationship between the inter-coil potential V1 and the potential V2 of the positive terminal of the motor 40 during a lapsed time from the start of a current conduction to the motor 40. As shown in FIG. 6, the potential V2 of the positive terminal of the motor 40 becomes a constant voltage immediately after a current conduction is started so that the inter-coil voltage V1 becomes a constant voltage after a predetermined time (about one second) since the current conduction is started.

An output of the potential measuring device 47 is applied to the decision circuit of the control unit, in a similar manner to that of the second embodiment, and the decision circuit decides whether the motor 40 is rotating normally or not, based on the input value. When a detected inter-coil voltage V1 is lower than that during the normal rotation, the motor 40 is in the locked state or the half-locked state due to an inclusion of a foreign material in the fan, and a decision is made that an anomalous condition has occurred. When a decision has been made in this way that an anomalous condition has occurred, an anomalous occurrence signal is output from the decision circuit to the CPU and the crew is informed of the occurrence of an anomalous condition by the alarming unit.

According to the present embodiment, since an inductive electromotive force to be generated according to the rotation of the motor 40 is detected by the auxiliary brush 46, the setting becomes easy, there is no cost increase, the reliability is improved and there in no problem of layout, as is the case with each of the above-described embodiments.

Further, since the auxiliary brush 46 is structured by a flexible thin panel and is brought into contact with the commutator 43 in a flexibly folded state, the brush 46 is pressured to the commutator 43 by the repulsive force of the brush 46. Accordingly, a conductive failure will not occur.

Further, the structure of the detecting apparatus is not limited to the one described above so long as the detecting apparatus detects an inductive electromotive force generated according to the rotation of the motor.

What is claimed is:

1. An apparatus for detecting an anomalous condition of a cooling motor fan to be mounted on a vehicle, comprising:

a detector for detecting a rotational electromotive force generated according to a rotation of a motor during a driving of said motor fan; and a decision circuit for deciding whether an anomalous condition exists or not based on said detected rotational electromotive force, wherein said motor fan operates by receiving a drive signal, said decision circuit makes a decision that the anomalous condition exists when the voltage between a pair of motor terminals is smaller than a first predetermined value in a state that said drive signal is being output, and said predetermined value is a value obtained by subtracting a variation value in the rotational electromotive force from a value of the rotational electromotive force during a normal rotation of said motor.

2. An apparatus for detecting an anomalous condition of a cooling motor fan to be mounted on a vehicle, comprising:

a detector for detecting a rotational electromotive force generated according to a rotation of a motor during a driving of said motor fan; and a decision circuit for deciding whether an anomalous condition exists or not based on said detected rotational electromotive force, wherein said motor has a plurality of pairs of positive and negative terminals, and said rotational electromotive force is a value detected as a potential difference between the positive and negative terminals other than the terminals being used for driving said motor.

3. An apparatus for detecting an anomalous condition of a cooling motor fan according to claim 2, wherein said positive and negative terminals include a pair of positive and negative terminals for low speed rotation, and said rotational electromotive force is a value detected as a potential difference between the positive and negative terminals other than the pair of terminals for low speed rotation as the pair of terminals for low speed rotation is used for driving said motor.

4. An apparatus for detecting an anomalous condition of a cooling motor fan according to claim 2, wherein said positive and negative terminals include a first pair of positive and negative terminals for low speed rotation and a second pair of positive and negative terminals for high speed rotation, and said rotational electromotive force is a value detected as a potential difference between the second pair of terminals as the first pair of terminals is used for driving said motor.

5. An apparatus for detecting an anomalous condition of a cooling motor fan to be mounted on a vehicle, comprising:

a detector for detecting a voltage between a pair of positive and negative terminals of a motor of said motor fan;

a decision circuit for deciding whether an anomalous condition exists or not based on the voltage detected between said terminals; and an external resistor provided between said positive terminal of said motor and a power source, wherein said motor fan operates by receiving a drive signal, said decision circuit makes a decision that the anomalous condition exists when the voltage between said terminals is smaller than a first predetermined value in a state that said drive signal is being output, and said decision circuit makes a decision that the anomalous condition exists when the voltage between said terminals is larger than a second predetermined value smaller than said first predetermined value in a state that said drive signal is not being output.

6. An apparatus for detecting an anomalous condition of a cooling motor fan to be mounted on a vehicle, comprising:

a detector for detecting a voltage between a pair of positive and negative terminals of a motor of said motor fan;

a decision circuit for deciding whether an anomalous condition exists or not based on the voltage detected between said terminals; and an external resistor provided between said positive terminal of said motor and a power source, wherein said motor fan operates by receiving a drive signal, said decision circuit makes a decision that the anomalous condition exists when the voltage between said terminals is smaller than a first predetermined value in a state that said drive signal is being output, said motor has an internal resistor, and said first predetermined value is a value based on a reference value to be determined by a resistance ratio between resistance values of said external resistor and said internal resistor and a voltage of said power source during a normal rotation of said motor.

7. An apparatus for detecting an anomalous condition of a cooling motor fan according to claim 6, wherein said first predetermined value is a value obtained by subtracting a variation value in the voltage between said terminals from said reference value.

8. An apparatus for detecting an anomalous condition of first and second cooling motor fans connected in series to be mounted on a vehicle, comprising:

a detector for detecting a potential between motors of said first and second cooling motor fans, and a decision circuit for deciding whether an anomalous condition exists or not based on said potential detected between motors.

9. An apparatus for detecting an anomalous condition of a cooling motor fan according to claim 8, wherein said motor fan operates by receiving a drive signal, and said decision circuit makes a decision that the anomalous condition exists when a voltage between said motors is smaller than a first predetermined value or larger than a second predetermined value which is larger than said first predetermined value in a state that said drive signal is being output.

10. An apparatus for detecting an anomalous condition of a cooling motor fan according to claim 9, wherein said first predetermined value is a value obtained by subtracting a variation value in the potential between the motors from a value of the potential between the motors during a normal rotation thereof, said second predetermined value is a value obtained by adding the variation value in the potential to the value of the potential between the motors during the normal rotation.

11. An apparatus for detecting an anomalous condition of a cooling motor fan to be mounted on a vehicle, comprising:

a detector for detecting a rotational electromotive force generated according to a rotation of a motor during a driving of said motor fan; and a decision circuit for deciding whether an anomalous condition exists or not based on said detected rotational electromotive force, wherein said motor further includes a commutator having a plurality of conductive blocks mutually insulated, a pair of conductive brushes for contacting with said commutator, and a plurality of coils connected in series through said plurality of conductive blocks, said detector has a detecting brush for being brought into contact with said commutator between said pair of conductive brushes, and said rotational electromotive force is obtained by being detected as a potential between said coils generated in said detecting brush.

12. An apparatus for detecting an anomalous condition of a cooling motor fan according to claim 11, wherein said detecting brushes are formed by a thin panel having conductivity.

13. An apparatus for detecting an anomalous condition of a cooling motor fan according to claim 12, wherein said detecting brushes have flexibility and are brought into pressure contact with said commutator in a flexibly folded state.

* * * * *